(12) United States Patent
Gattami

(10) Patent No.: US 10,257,004 B2
(45) Date of Patent: Apr. 9, 2019

(54) INTER-BLOCK INTERFERENCE SUPPRESSION USING A NULL GUARD INTERVAL

(71) Applicant: Telefonaktiebolaget LM Ericsson (publ), Stockholm (SE)

(72) Inventor: Ather Gattami, Stockholm (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 15/538,542

(22) PCT Filed: Dec. 23, 2014

(86) PCT No.: PCT/EP2014/079190
§ 371 (c)(1),
(2) Date: Jun. 21, 2017

(87) PCT Pub. No.: WO2016/102007
PCT Pub. Date: Jun. 30, 2016

(65) Prior Publication Data
US 2017/0359207 A1 Dec. 14, 2017

(51) Int. Cl.
*H04L 27/26* (2006.01)
*G06F 3/06* (2006.01)

(52) U.S. Cl.
CPC .......... *H04L 27/2605* (2013.01); *G06F 3/064* (2013.01); *H04L 27/2626* (2013.01); *H04L 27/2666* (2013.01)

(58) Field of Classification Search
USPC ......................................... 375/267; 370/335
See application file for complete search history.

(56) References Cited

U.S. PATENT DOCUMENTS

| 6,069,884 | A  | * | 5/2000  | Hayashi  | H04B 7/0608 |
|           |    |   |         |          | 370/335     |
| 7,668,251 | B2 | * | 2/2010  | Magee    | H04B 7/02   |
|           |    |   |         |          | 375/260     |
| 2016/0308697 | A1 | * | 10/2016 | Gattami  | H04L 25/03834 |
| 2017/0324590 | A1 | * | 11/2017 | Beidas   | H04L 1/005  |
| 2018/0034671 | A1 | * | 2/2018  | Hasegawa | H04L 25/03159 |

FOREIGN PATENT DOCUMENTS

| WO | 9729568 A1    | 8/1997  |
| WO | 2009149429 A2 | 12/2009 |

OTHER PUBLICATIONS

Ringh, Emil, "Low complexity algorithms for faster-than-Nyquist signaling", Master of Science Thesis, Stockholm, Sweden 2013, 2013, 1-82.

* cited by examiner

*Primary Examiner* — Eva Y Puente
(74) *Attorney, Agent, or Firm* — Patent Portfolio Builders, PLLC

(57) ABSTRACT

A method of transmitting data over a wireless communications channel comprises transmitting a plurality of blocks (70), in which each block (70) comprises a plurality of symbols (71, 72, 73, 74, 75) representing the data. The symbols are transmitted using time packing, or Faster-than-Nyquist signalling, such that each symbol in a block overlaps in the time domain with at least one other symbol in the block. A null guard interval (77) is included in each block, having a length that means that inter-symbol interference is not a cause of inter-block interference.

21 Claims, 4 Drawing Sheets

INTER-BLOCK INTERFERENCE SUPPRESSION USING A NULL GUARD INTERVAL

TECHNICAL FIELD

This invention relates to wireless communications, and in particular to wireless communications using Faster-than-Nyquist signalling.

BACKGROUND

When signals, made up of multiple symbols arranged in blocks, are transmitted over a wireless communications channel, there is a high probability that the signal will be received with some form of distortion. For example, the signal may arrive at the receiver along multiple paths, such as a direct line-of-sight path and one or more reflected path. This distortion has the possibility to cause inter-symbol interference, or inter-block interference.

The Nyquist criterion sets the conditions that must be met by the channel, and by the transmitted symbols, in order to avoid inter-symbol interference. One aspect of the Nyquist criterion is that, for a given channel, it sets a lower limit on the time separation of the data-bearing pulses.

It is also known that it is possible to transmit signals in the form of Nyquist pulses, but with a time separation between pulses that is shorter than that specified by the Nyquist criterion. This is referred to as Faster-than-Nyquist signalling. This has the advantage that it can increase the data throughput. However, it has the disadvantageous effect that there will be inter-symbol interference, that is, that samples obtained at the receiver will be dependent on more than one of the transmitted symbols. There is therefore an increased probability of errors in the receiver.

SUMMARY

According to a first aspect of the invention, there is provided a method of transmitting data over a wireless communications channel, comprising transmitting a plurality of blocks, each block comprising a plurality of symbols representing said data, and comprising transmitting said symbols using time packing, such that each symbol in a block overlaps in the time domain with at least one other symbol in the block. The method also comprises including a null guard interval in each block.

According to a second aspect of the invention, there is provided a transmitter, for transmitting data over a wireless communications channel, the transmitter being configured for transmitting a plurality of blocks, each block comprising a plurality of symbols representing said data, and transmitting said symbols using time packing, such that each symbol in a block overlaps in the time domain with at least one other symbol in the block. A null guard interval is included in each block.

According to a third aspect of the invention, there is provided a method of receiving data over a wireless communications channel, comprising receiving a plurality of blocks, each block comprising a plurality of symbols representing said data, wherein said symbols have been transmitted using time packing, such that each symbol in a block overlaps in the time domain with at least one other symbol in the block. Each block includes a null guard interval.

According to a fourth aspect of the invention, there is provided a receiver, for receiving data over a wireless communications channel, the receiver being configured for receiving a plurality of blocks, each block comprising a plurality of symbols representing said data, wherein said symbols have been transmitted using time packing, such that each symbol in a block overlaps in the time domain with at least one other symbol in the block. Each block includes a null guard interval.

According to a fifth aspect of the invention, there is provided a computer program product, comprising computer-readable storage medium containing instructions for causing a device to perform a method according to the first or third aspect.

DETAILED DESCRIPTION

Figure 1:
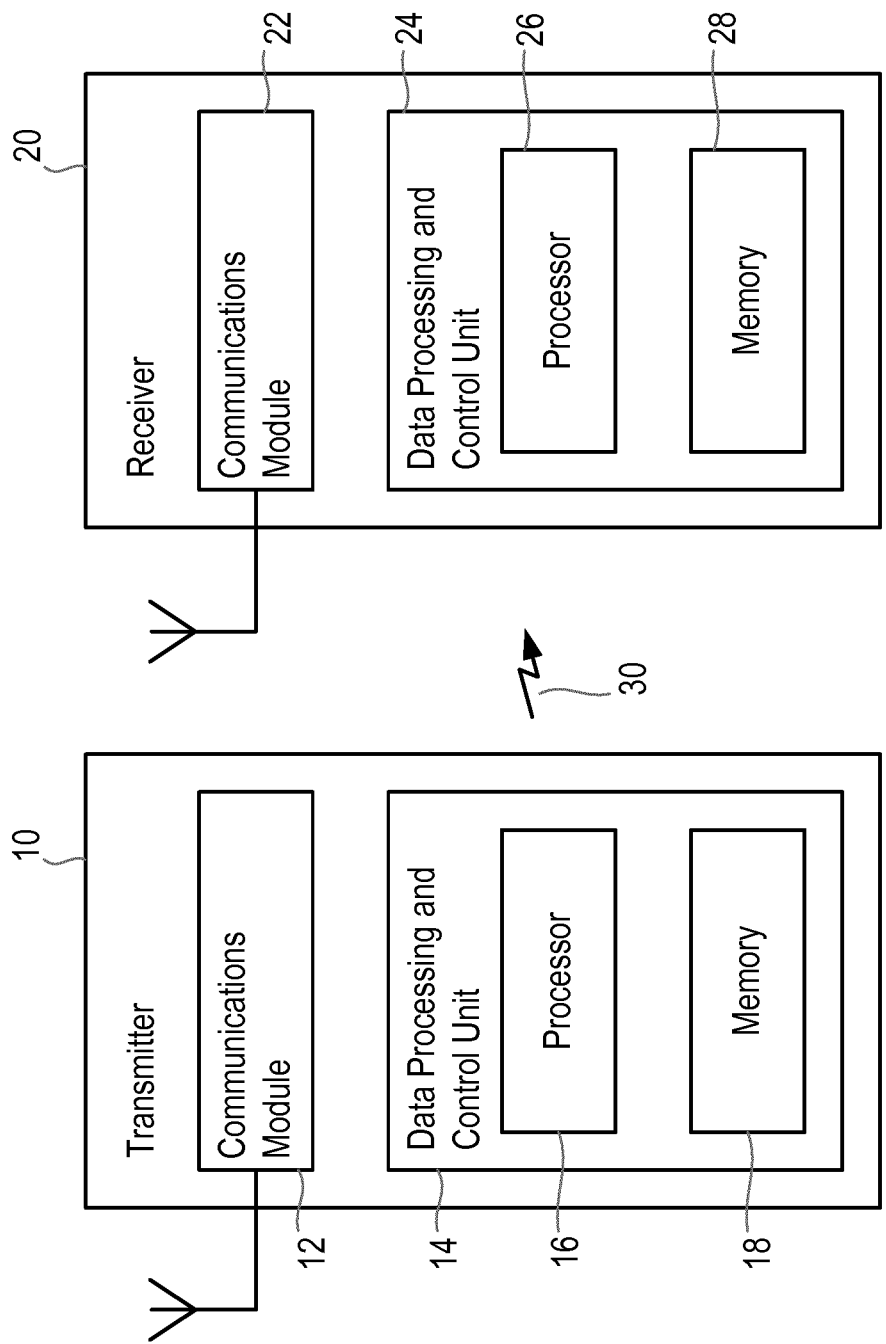
FIG. 1 is a schematic illustration of a communication system in accordance with an embodiment.

FIG. 1 illustrates a communication system, comprising a transmitter 10 and a receiver 20.

The transmitter 10 includes a communications module 12 and a data processing and control unit 14. The data processing and control unit 14 includes a processor 16 and a memory 18. The processor 16 performs data processing and logical operations, and the memory 18 stores working data and program instructions for causing the processor to perform the methods described herein. The communications module 12 generates signals in a suitable form for transmission in accordance with a suitable communications standard.

Similarly, the receiver 20 includes a communications module 22 and a data processing and control unit 24. The data processing and control unit 24 includes a processor 26 and a memory 28. The processor 26 performs data processing and logical operations, and the memory 28 stores working data and program instructions for causing the processor to perform the methods described herein. The program instructions may be provided in the form of a computer-program product, containing said instructions in a computer-readable form. The communications module 22 receives signals that have been transmitted in accordance with a suitable communications standard, and extracts data from the received signals.

Although FIG. 1 shows a transmitter 10 and a receiver 20, it will be appreciated that, in many applications, the communications between two devices are bidirectional. That is, while a first device transmits signals to a second device, the second device may also transmit signals to the first device, either at the same time as the first device is transmitting, or at different times. Thus, the transmitter 10 and the receiver 20 may be included in any fixed or portable device for wireless communications, including, but not limited to, laptop or tablet computers, cellphones including smartphones, cellular base stations or wireless access points, or remote sensors for machine-to-machine communications.

As shown in FIG. 1, the transmitter 10 and the receiver 20 communicate over a wireless communications channel 30.

Figure 2:
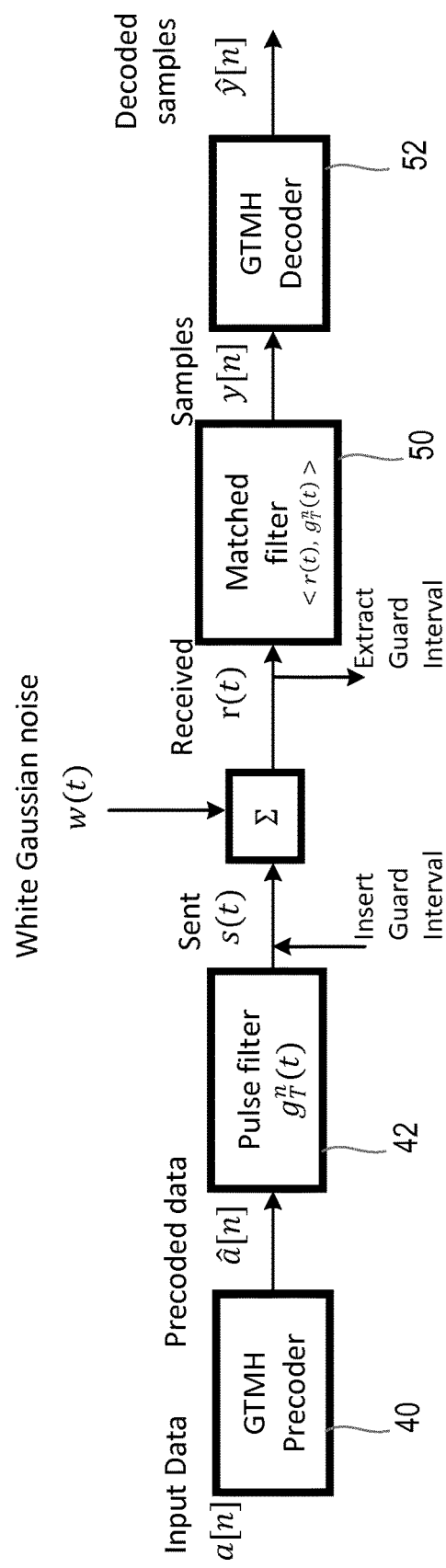
FIG. 2 is a more detailed illustration of the communication system of FIG. 1.

FIG. 2 shows in more detail the form of the signals that are generated, transmitted, received and extracted in the transmitter 10 and the receiver 20.

Specifically, FIG. 2 shows a system using Faster-than-Nyquist signalling, in which time packing is used. That is, Nyquist pulses are generated, with sampling rate based on a sample period T. However, instead of sending the pulses time-separated by T seconds, they are instead sent separated by ρT seconds, where 0<ρ<1. As such, the symbols are transmitted in a non-orthogonal form.

As discussed in more detail below, received input data a[n] is applied to a precoder 40 to obtain precoded data The precoded data â[n] is applied to a pulse filter 42 to generate the signal for transmission. In one embodiment, the data â[n] is used as the amplitudes for pulses, using Pulse Amplitude Modulation (PAM). However, it will be appreciated that other modulation schemes may be used.

In order to generate signals in a form suitable for transmission using Faster-than-Nyquist signalling, the pulse filter 42 acts on the precoded data â[n] to obtain a transmitted signal s(t), where:

$$s(t) = \sum_k â[k] \cdot \sqrt{\rho}\, g_T(t - k\rho T)$$

where $\sqrt{\rho}\, g_T(t-n\rho T)$ is the new pulse shape, normalized so as not to increase the transmit power in the receiver. Other pulse filters are possible.

When the signal s(t) is transmitted over a wireless channel 30 that can be regarded as causing Additive White Gaussian Noise (AWGN), this gives the received signal r(t) as:

$$r(t) = s(t) + w(t),$$

where w(t) is a stationary, white, Gaussian process.

As shown in FIG. 2, the received signal r(t) is sampled using a matched filter 50 to optimize the signal-to-noise ratio (SNR) and to obtain a sufficient set of data points y[n] for the signal estimation. Thus:

$$y[n] = \int_{-\infty}^{\infty} r(t) \cdot \sqrt{\rho}\, g_T(t - n\rho T)\, dt.$$

The problem in the receiver is then, given the samples y[n], to estimate the original input data a[n] with the lowest possible probability of error.

It has been determined that the samples y[n] are related to the transmitted data â[n] and the noise w(t) as:

$$y = G\hat{a} + G^{1/2} w$$

where w is the Gaussian noise expressed as an independent and identically distributed (i.i.d.) variable, and G is a matrix whose elements are given by:

$$G_{m,n} = \int_{-\infty}^{\infty} \sqrt{\rho}\, g_T(t - n\rho T) \cdot \sqrt{\rho}\, g_T(t - m\rho T)\, dt.$$

Thus, the form of the matrix G is dependent on the form of the specific pulse-shaping filter that is used. The precoding applied by the precoder block 40, mentioned above, is based on this relationship between the samples y[n], the transmitted data â[n], and the noise w(t). The precoding is based on the pulse shape, from the pulse-shaping filter. The precoding is further based on the amount of overlap of the symbols in the Faster-than-Nyquist form, e.g. as indicated by the parameter ρ.

Specifically, the precoding that is used in the precoder block 40 is referred to as G-to-minus-half (GTMH) precoding. This is described in "Low complexity algorithms for faster-than-Nyquist signaling", Emil Ringh, MSC thesis, Stockholm, Sweden, 2013. Instead of using the input data bits a∈A as the amplitudes for the PAM symbols, these are transformed to precoded bits â, where $$\hat{a} = G^{-1/2} a,$$

and the symbols â are also taken from an alphabet A, which may for example be made up of binary numbers in real or complex form.

The precoded bits â are therefore applied to the pulse filter 42 before transmission. After transmission over the wireless channel, the received signal is passed to a matched filter 50. In this example, the precoding is G-to-minus-half (GTMH), and optionally, G is a matrix whose form is dependent on the form of the pulse-shaping filter.

The data samples y[n] obtained by the matched filter 50 are then supplied to a G-to-minus-half (GTMH) decoding block 52. Thus, the data samples y[n] are transformed to decoded samples ŷ[n].

The aim of the receiver is to obtain estimates for the input data bits a, given the data samples y[n].

Using the relationship between the input data bits a and the precoded bits â, the previously derived relationship $y = G\hat{a} + G^{1/2} w$ can be rewritten as:

$$y = G^{1/2} a + G^{1/2} w.$$

Therefore, by applying the G-to-minus-half (GTMH) decoding in the block 52, that is, transforming the received data samples y[n] to obtain decoded samples using $$G^{1/2}\, \hat{y} = y, \text{ or } \hat{y} = G^{-1/2} y,$$

it can be seen that $$\hat{y} = G^{-1/2} y = a + w.$$

The effect of this is that the receiver, by obtaining the decoded samples ŷ[n] from the data samples y[n], can obtain values that can then be used to obtain estimates for the input data.

Specifically, as one example, the decoded samples ŷ[n] can then be applied to a maximum likelihood (ML) estimation block (not shown in FIG. 2), using any convenient channel estimation algorithm, in order to arrive at estimates of the input data bits a.

Thus, the effect of GTMH-precoding is to reduce the complexity of the estimation that must be performed in the receiver, in this specific case of Faster-than-Nyquist signalling.

Figure 3:
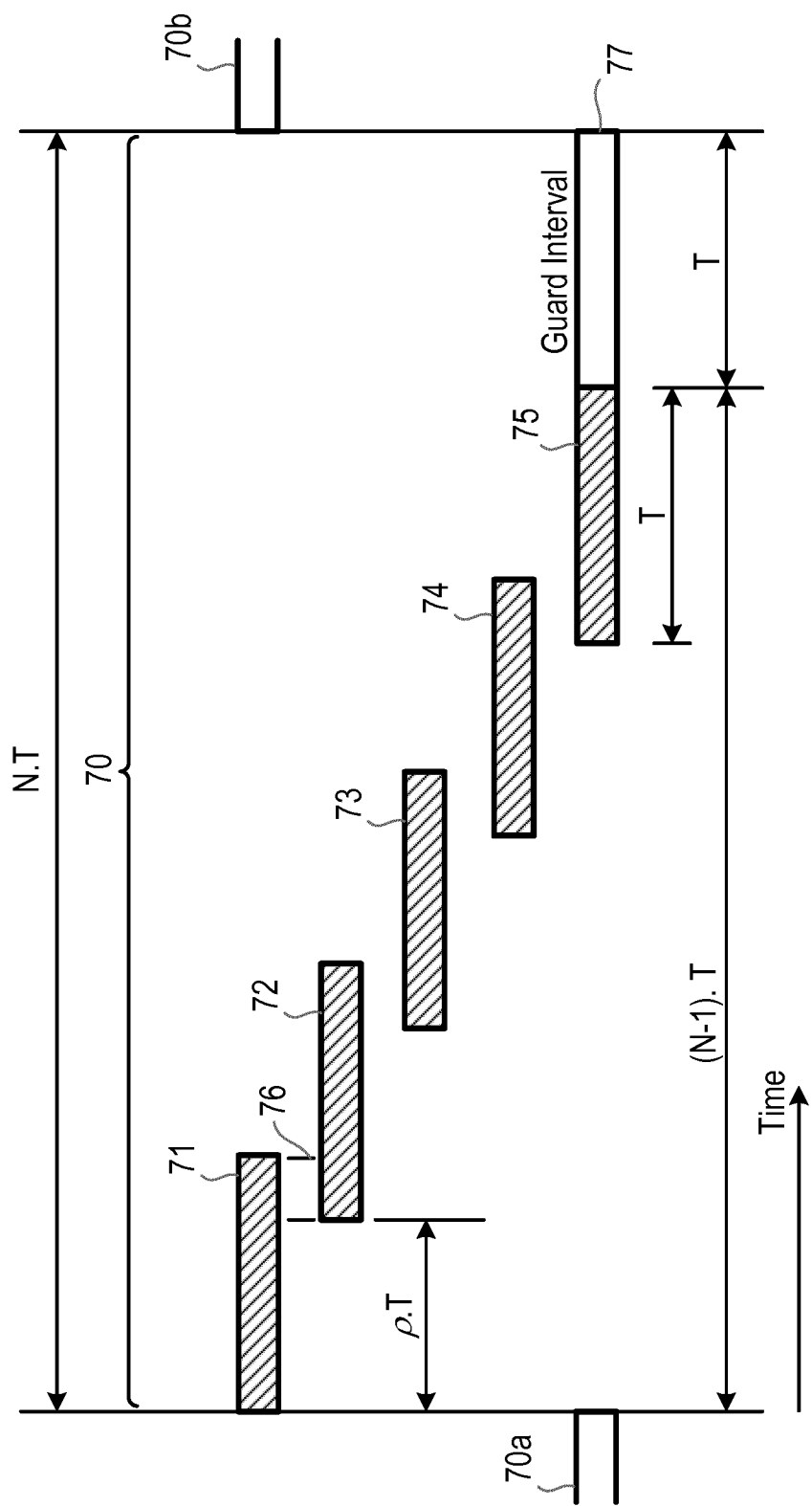
FIG. 3 illustrates the form of signals transmitted in the communication system of FIGS. 1 and 2.

One issue that still arises with Faster-than-Nyquist signalling is inter-symbol interference. FIG. 3 illustrates a method for transmitting symbols, using Faster-than-Nyquist signalling, in a manner that mitigates or avoids the possibility of inter-block interference.

Specifically, FIG. 3 shows a block 70, containing symbols 71, 72, 73, 74, 75, which represent the precoded input data. Although FIG. 3 shows the whole of only one block 70, it also shows the end of a preceding block 70a and the start of a succeeding block 70b. The transmissions from the transmitter contain a sequence of such blocks, which may all have the general form shown in FIG. 3.

In the general case, the block contains a first number, N, of symbols. Thus, in this illustrated example, N=5. In a typical case, the number of symbols in a block is predetermined, and known in advance to the transmitter and the receiver.

Each symbol has a duration T, referred to herein as a standard symbol period, which may for example be the Nyquist symbol period. Thus, when an orthogonal transmission scheme is used, the starts of the symbols are separated in time by the standard symbol period, or pulse duration, T, and N symbols occupy a period N.T.

However, because Faster-than-Nyquist signalling is being used, the starts of successive pulses are separated in time not by the pulse duration T, but by a shorter period ρT (that is, 0<ρ<1). Thus, the effect is that, during periods such as the period 76, two successive pulses (in this case the pulses 71, 72) overlap.

In this illustrated example, the effect of using the shorter pulse separation is that the first number, N, of symbols occupies a second integer number of standard symbol periods, the second number being smaller than the first number. In this example, the second number is one less than the first number, and so N symbols occupy (N−1) standard symbol periods. In order to achieve this, it can be seen the reduced pulse separation ρ=(N−2)/(N−1). Alternatively, ρ=(N−1)/N.

In other examples, the effect of using the shorter pulse separation is that the first number, N, of symbols occupies a second number of standard symbol periods, where the second number is smaller than the first number by an amount of more or less than one standard symbol period. The second number need not be an integer.

Further, as shown in FIG. 3, the block 70 includes a guard interval 77, during which no symbol, or any part of any symbol, is transmitted. A repetition cyclic prefix is not transmitted within the guard interval 77. That is, the guard interval 77 is a null guard interval.

In this illustrated embodiment, the guard interval 77 follows the symbols 71, 72, 73, 74, 75. The next block (for example the block 70b as shown in FIG. 3) then follows immediately at the end of the guard interval 77. In an alternative embodiment, the guard interval could be included at the start of each block, with similar effect.

Thus, a plurality of blocks are transmitted, each block comprising a plurality of symbols representing data, the symbols being transmitted using time packing, such that each symbol in a block overlaps in the time domain with at least one other symbol in the block, and each block also including a null guard interval.

In one preferred embodiment, the data processing and control unit 14 of the transmitter 10 is able to interpret signals received by the communications module 12, in order to measure or estimate the inter-symbol interference caused by the channel. The amount of inter-symbol interference can be assessed in terms of the number of consecutive symbols that interfere with each other. For example, in the case of inter-symbol interference caused by multipath effects, this is a function of the difference in the path length between the line-of-sight transmission path and the longest detectable echo path. This difference can then be expressed in terms of symbol periods. If the difference is less than one symbol period, then two consecutive symbols will interfere with each other. If the difference is greater than one symbol period but less than two symbol periods, then one symbol will interfere not only with the next symbol but also with the symbol following that next symbol. For still greater differences, a symbol will interfere with more of the other symbols.

The length of the guard interval can then be chosen, for example by the data processing and control unit 14 of the transmitter 10, and the signals can be transmitted by the transmitter 10 so that, although there is inter-symbol interference because of the effects of the channel and because of the use of Faster-than-Nyquist (FTN) signalling, inter-block interference is mitigated or avoided. Thus, in a system in which the channel is such that there is inter-symbol interference between two consecutive symbols, a null guard interval can be chosen so that it has a duration of one symbol period T, as shown in FIG. 3. This has the effect that there is no inter-symbol interference between the last symbol of one block and the first symbol of the next block, and therefore no inter-block interference. Therefore this allows the use of the FTN signalling and/or allows use of the GTMH precoding described above.

Where the effects of channel dispersion or multipath mean that there can be inter-symbol interference between more than two consecutive symbols (that is, the channel is longer than 2 taps), it is necessary to include a longer null guard interval in order to ensure that there is no inter-block interference. The length of the null guard interval can therefore be selected so that it is longer than the length over which inter-symbol interference occurs. The length of the null guard interval can be selected to be an integer number of symbol periods or a non-integer number of symbol periods. In some examples, the guard interval is based on the determined number of channel taps. For examples, the the guard interval is equal to or longer than the duration of a number of symbols, wherein the number corresponds to the number of channel taps minus one.

Where the inter-symbol interference caused by the channel is measured, the length of the null guard interval can be adapted on the fly to account for varying channel conditions while the system is in use. In some examples, any alterations are signalled between the transmitter and the receiver. In some examples, the method comprises measuring a degree of inter-symbol interference of said channel; and setting a length of said null guard interval in response thereto.

Thus, FIG. 2 shows a null guard interval of suitable length being inserted into the signal before transmission, and conversely shows the guard interval being removed in the receiver before the signals are passed to the matched filter 50.

In the embodiment illustrated in FIG. 3, the Faster-than-Nyquist signalling is used to transmit a block of N symbols during (N−1) symbol periods. Also, the null guard interval has a duration of one standard symbol period. The overall effect is therefore that the block contains N symbols and has a duration of N standard symbol periods. In another embodiment, where it is found that it is useful to use a null guard interval having a longer duration, for example of M symbol periods, the Faster-than-Nyquist signalling may be used to transmit a block of N symbols during (N−M) symbol periods. The overall effect is again therefore that the block contains N symbols and has a duration of N symbol periods.

However, in other examples, the Faster-than-Nyquist signalling may be used to transmit a block of N symbols during (N-P) symbol periods, where the null guard interval has a duration of less than P symbol periods, and so the overall effect is that the block contains N symbols in a duration shorter than N symbol periods. In still further examples, the Faster-than-Nyquist signalling may be used to transmit a block of N symbols during (N-P) symbol periods, where it is decided to use a null guard interval having a duration of greater than P symbol periods, and so the overall effect is that the block contains N symbols in a duration longer than N symbol periods.

Figure 4:
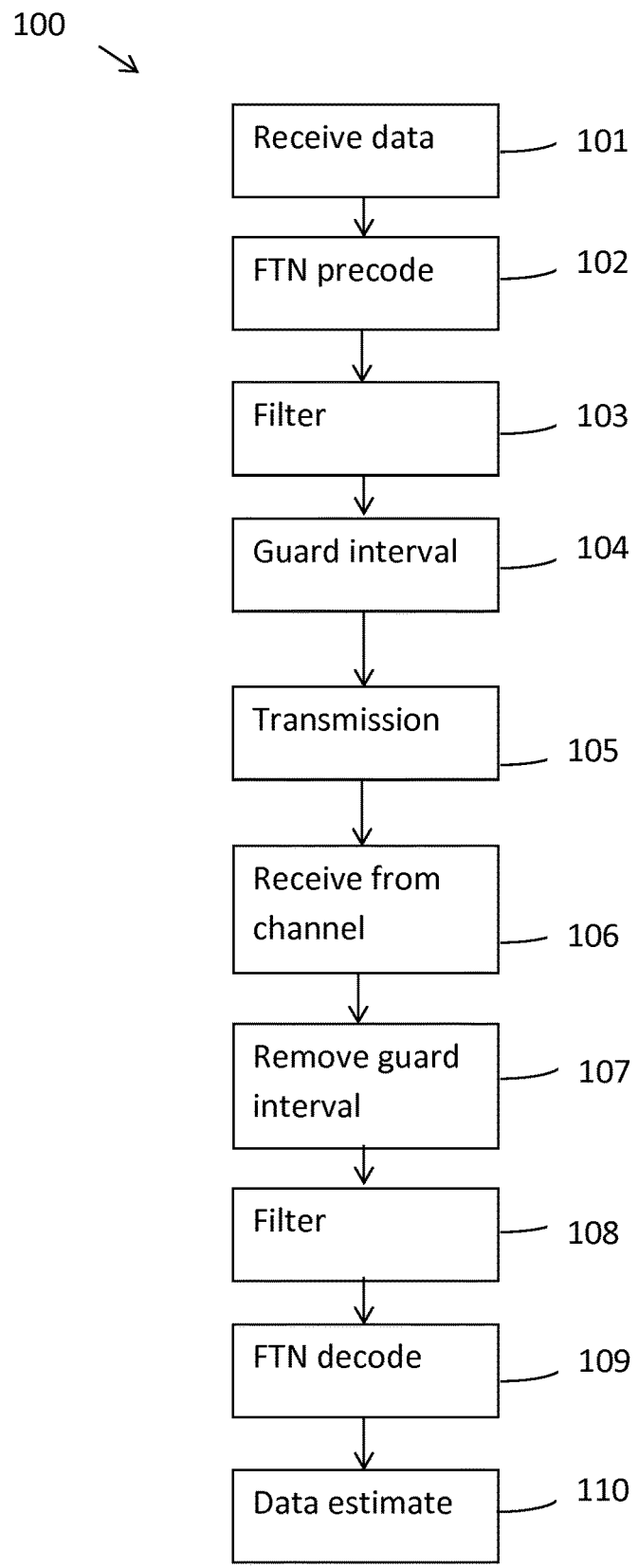
FIG. 4 illustrates a method according to an embodiment.

FIG. 4 shows a method 100 according to one or more example. An embodiment may be a part only of the steps shown.

In a transmitter, data is received in 101. IN 102, the data is precoded for faster-than-Nyquist transmission in. Optionally, the precoding is based on the filter 42. For example, the method comprises applying precoding to input data; and passing the precoded input data to a pulse-shaping filter. In 103, the signal is filtered, e.g. by the pulse filter 42. In 104, a guard interval is inserted prior to transmission over the channel. In 105, the signal is transmitted.

In 106, a receiver receives the transmitted signal from the wireless channel. In 107, the guard interval is removed. In 108, the signal is filtered using a matched filter 50. In 109, the faster-than-Nyquist signal is decoded. In 110, an estimate is made of the transmitted data.

There is therefore described a method and a system in which signals for transmission can be transmitted using time packing, with the guard interval being inserted in order to ensure that inter-block interference is mitigated.

In one embodiment, there is provided a method of transmitting data over a wireless communications channel, comprising: transmitting a plurality of blocks, each block comprising a plurality of symbols representing said data. The method further comprises transmitting said symbols using time packing, such that each symbol in a block overlaps in the time domain with at least one other symbol in the block; and including a null guard interval in each block.

Any example of the apparatus and method may be combined with any other example of the apparatus and method.

The invention claimed is:

1. A method of transmitting data over a wireless communications channel, the method comprising:
applying precoding to input data;
passing said precoded input data to a pulse-shaping filter to generate a plurality of symbols for transmission; and
transmitting a plurality of blocks, each block of said plurality of blocks comprising said plurality of symbols representing said precoded input data, wherein transmitting said plurality of blocks comprises:
transmitting said plurality of symbols using time packing, such that each symbol in a block of said plurality of blocks overlaps in the time domain with at least one other symbol in the block; and
including a null guard interval in each block.

2. The method of claim 1, wherein transmitting said plurality of symbols using said time packing comprises transmitting said plurality of symbols using Faster-than-Nyquist signaling.

3. The method of claim 1, wherein said precoding is G-to-minus-half (GTMH), and wherein G is a matrix whose form is dependent on form of the pulse-shaping filter.

4. The method of claim 1, wherein said time packing is such that each block comprises a first number of symbols, transmitted during a time period that is equal to a second number of symbol periods, said second number being less than the first number.

5. The method of claim 4, wherein said second number is one less than the first number.

6. The method of claim 1, wherein said null guard interval has a duration that is equal to an integer number of symbol periods (T).

7. The method of claim 6, wherein said null guard interval has the duration that is equal to one symbol period.

8. The method of claim 1, wherein the null guard interval is included at the end of each block.

9. The method of claim 1, further comprising:
measuring a degree of inter-symbol interference of said wireless communications channel; and
setting a length of said null guard interval in response thereto.

10. The method of claim 9, wherein the length of said null guard interval is set in such a way as to avoid inter-block interference.

11. A transmitter for transmitting data over a wireless communications channel, the transmitter comprising:
a wireless communications circuit; and
a processing circuit operably coupled to the wireless communications circuit and configured to control the wireless communications circuit to:
apply precoding to input data;
apply a pulse-shaping filter to receive said precoded input data and to generate a plurality of symbols for transmission; and
transmit a plurality of blocks, each block of said plurality of blocks comprising said plurality of symbols representing said precoded input data, wherein to transmit said plurality of blocks, the processing circuit is configured to:
transmit said plurality of symbols using time packing, such that each symbol in a block of said plurality of blocks overlaps in the time domain with at least one other symbol in the block; and
include a null guard interval in each block.

12. The transmitter of claim 11, wherein said precoding is G-to-minus-half (GTMH), and wherein G is a matrix whose form is dependent on form of the pulse-shaping filter.

13. The transmitter of claim 11, wherein said time packing is such that each block comprises a first number of symbols, transmitted during a time period that is equal to a second number of symbol periods, said second number being less than the first number.

14. The transmitter of claim 11, wherein the processing circuit is further configured to:
measure a degree of inter-symbol interference of said wireless communications channel; and
set a length of said null guard interval in response thereto.

15. The transmitter of claim 14, wherein the length of said null guard interval is set in such a way as to avoid inter-block interference.

16. A method of receiving data over a wireless communications channel, the method comprising:
receiving a plurality of blocks, each block of said plurality of blocks comprising a plurality of symbols representing said data, wherein said plurality of symbols have been transmitted using time packing, such that each symbol in a block of said plurality of blocks overlaps in the time domain with at least one other symbol in the block, and wherein each block includes a null guard interval;
passing the received plurality of blocks to a filter matching a pulse-shaping filter in a transmitter; and
passing an output of said filter to a decoder corresponding to a precoding block in the transmitter for decoding said output.

17. The method of claim 16, wherein said decoding is G-to-minus-half (GTMH), and wherein G is a matrix whose form is dependent on form of the pulse-shaping filter.

18. The method of claim 16, further comprising extracting the null guard interval from the end of each block.

19. A receiver, for receiving data over a wireless communications channel, the receiver comprising:
a wireless communications circuit; and
a processing circuit operably coupled to the wireless communications circuit and configured to control the wireless communications circuit to:
receive a plurality of blocks, each block of the plurality of blocks comprising a plurality of symbols representing said data, wherein said plurality of symbols have been transmitted using time packing, such that each symbol in a block of said plurality of blocks overlaps in the time domain with at least one other symbol in the block, and wherein each block includes a null guard interval;

apply a filter, matching a pulse shaping filter in a transmitter, to filter the received plurality of blocks; and decode the filtered received plurality of blocks using a decoder corresponding to a precoding block in the transmitter.

20. The receiver of claim 19, wherein the processing circuit is configured to decode the filtered received plurality of blocks using G-to-minus-half (GTMH) decoding, and wherein G is a matrix whose form is dependent on form of the pulse-shaping filter in the transmitter.

21. A non-transitory computer-readable medium comprising, stored thereupon, instructions for causing a device to perform the method of claim 1.

\* \* \* \* \*